(12) United States Patent
Mäckle et al.

(10) Patent No.: US 6,347,802 B1
(45) Date of Patent: Feb. 19, 2002

(54) WHEEL SUSPENSION FOR MOTOR VEHICLES, IN PARTICULAR INDEPENDENT WHEEL SUSPENSION FOR PASSENGER CARS

(75) Inventors: Günther Mäckle, Stuttgart; Thomas Schirle, Öhringen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/371,988

(22) Filed: Aug. 12, 1999

(30) Foreign Application Priority Data

Aug. 12, 1998 (DE) .......................... 198 36 440

(51) Int. Cl.⁷ ................................. B60G 3/26
(52) U.S. Cl. ................. 280/5.521; 280/5.52; 280/5.522
(58) Field of Search ............... 280/5.521, 5.52, 280/5.522, 86.751, 86.757, 93.512

(56) References Cited

U.S. PATENT DOCUMENTS

| | | | | |
|---|---|---|---|---|
| 4,752,079 A | * | 6/1988 | Fahrner | 280/112 |
| 4,973,075 A | * | 11/1990 | Rori et al. | 280/661 |
| 5,048,860 A | * | 9/1991 | Kanai et al. | 280/691 |
| 5,094,472 A | * | 3/1992 | Oyama et al. | 208/661 |
| 5,292,149 A | * | 3/1994 | Luger | 280/661 |
| 5,620,199 A | * | 4/1997 | Lee | 280/691 |

FOREIGN PATENT DOCUMENTS

| | | |
|---|---|---|
| DE | 46 782 | 6/1966 |
| DE | 31 39 792 | 4/1983 |
| DE | 37 44 069 | 7/1988 |
| DE | 39 28 135 | 3/1990 |
| FR | 2 561 193 | 9/1985 |
| FR | 2 608 974 | 7/1988 |
| JP | 62-125907 | 6/1987 |

OTHER PUBLICATIONS

IT Journal A.M., p. 129 (Jun. 1994).

* cited by examiner

Primary Examiner—Lanna Mai
Assistant Examiner—Christopher Buchanan
(74) Attorney, Agent, or Firm—Kenyon & Kenyon

(57) ABSTRACT

A wheel suspension, in particular an independent wheel suspension, having active adjustment of the wheel camber. An intermediate carrier is arranged between the hub carrier holding the wheel and the body-side wheel suspension, in particular the wheel suspension links. The intermediate carrier is linked to the wheel suspension on the body side and has a pivot axis running in the longitudinal direction of the vehicle.

21 Claims, 4 Drawing Sheets

WHEEL SUSPENSION FOR MOTOR VEHICLES, IN PARTICULAR INDEPENDENT WHEEL SUSPENSION FOR PASSENGER CARS

FIELD OF THE INVENTION

The present invention relates to a wheel suspension for a motor vehicle, and in particular to an independent wheel suspension for passenger cars.

RELATED TECHNOLOGY

A wheel suspension is described in the IT journal A.M., 6/94, page 129. The wheel suspension described therein is designed as an independent wheel suspension in which an active adjustment of the wheel camber is provided, the camber adjustment being carried out by an actuator, or positioning member, that acts on one of the transverse suspension links that is directly coupled to the hub carrier, so that the wheel suspension geometry determined by the suspension links is changed overall in conjunction with the camber adjustment that is effected by adjustment of this suspension link. However, such a reciprocal influencing is in no way desirable, and it makes it virtually impossible to adjust the camber over large camber angle ranges because of the resulting effect on the wheel action.

A wheel suspension is described in German Patent Application No. DE 39 28 135 Al, in which the hub carrier is mounted using a ball joint in the intermediate carrier, whereby the mid-point of the ball joint lies within the wheel axis. The resulting swivelling capacity on all sides, which is controlled by actuators situated in the transition between the intermediate carrier and the hub carrier, is used to influence values significant for the vehicle driving performance, such as wheel camber, toe-in, etc., as a function of driving speed, transverse acceleration, steering angle, vehicle load etc. The order of magnitude of adjusting capabilities lies within the scope of that which is customary with regard to changes in camber, toe-in, toe-out, or steering angle on rear axles, due to driving performance, i.e., in the range of fairly small angle values.

The same is true for wheel suspensions described in German Patent Application No. DE 37 44 069 Al.

SUMMARY OF THE INVENTION

An object of the present invention is to provide a wheel suspension for motor vehicles, in particular an independent wheel suspension for passenger cars such that active camber adjustment makes it possible to use different tire properties and/or tire positions in relationship to the roadway in response to roadway characteristics and/or driving condition variables in order to improve the manageability of the vehicle without interference with the wheel suspension geometry.

The present invention provides a wheel suspension for motor vehicles, in particular independent wheel suspension for passenger cars, having a body-side wheel suspension, a hub carrier that is provided with an axle end holding the wheel, and having an intermediate carrier, which is positioned between the wheel suspension and hub carrier and upon which the hub carrier pivoted and against which the hub carrier is supported via an actuator acting in the vehicle transverse direction for active adjustment of the camber with reference to a pivot axis disposed in the vehicle longitudinal direction, characterized in that the pivot axis (9) of the hub carrier (8) running in vehicle longitudinal direction is vertically offset from the wheel axis, and a negative wheel camber on the order of magnitude of about 20–30° can be set by pivoting the hub carrier (8) in such a way that the tread contact surface is moved to a tread area of the tire that is adjacent to the inside of the wheel.

The wheel suspension used can be in the form of a rigid axle, a semi-rigid axle (e.g., a torsion beam axle), an independent wheel suspension or other type of wheel suspension. Depending on the type of wheel suspension that is used, the elements of the wheel suspension that form the connecting elements on the body side, i.e., the axle body, the suspension links of the torsion beam axle or the suspension links—rigid or non-rigid, for example leaf spring arms—of an independent wheel suspension are used as the body-side wheel suspension.

An embodiment according to the present invention, for example in the context of an independent wheel suspension, makes possible the use of independent wheel suspensions of known design and makes it possible, without intervening in the given wheel location or suspension geometry, to modify the camber angle of the wheel so that effects that previously had not been possible to implement can be carried out. This is especially true in connection with open loop and/or closed loop control strategies, in which the camber adjustment is performed as a function of the prevailing driving conditions and, if necessary, is performed as an automated adjustment in conformance therewith.

Thus, camber adjustment is useful with respect to the increase in transferrable lateral forces—high negative camber on the outer, curve-side wheels—it being possible to control the corresponding camber adjustment in response to the transverse acceleration, for example, by increasing the camber angle with increasing transverse acceleration. This offers special advantages in connection with tires that are supported on the roadway with different tread sections in relation to different camber angles, and in which these tread sections are adapted to the particular requirements with respect to the type of material and/or the tread profile.

The present invention makes it possible to implement strategies for improving driving safety by camber adjustment, for example by virtue of the fact that the corresponding influencing variables may be processed by a camber computer and input as the corresponding set point camber angles. This is done preferably on the four wheels of a multi-track vehicle, but at least on both wheels of an axle. Influencing variables to be considered are, e.g., the actual camber angle, the driving speed, the steering wheel angle and the steering wheel angle adjusting speed, the yaw rate, the road condition, and the given size of the wheel's tread contact surface relative to the particular camber angle to be set.

On vehicles that are equipped with a steering computer, at least some of these state variables are also recorded for the steering computer. In this case, the transverse acceleration, the speed, the steering wheel angle, the adjusting speed of the steering wheel angle, the yaw rate, etc., are to be considered as influence variables. In independent wheel suspensions according to the present invention, whose camber angle can be actively adjusted, the actual camber angle and the particular set point camber angle being targeted have an influence on the respective set point steering angle. Accordingly, the camber computer and the steering computer can interlinked and the recording of additional characteristic quantities, in particular characteristic quantities from the braking system, also makes it possible to use the camber adjustment to improve the driving dynamics and driving stability of the vehicle.

This means the camber adjustment can be used to manage highly dynamic obstacle avoidance maneuvers, on one hand using the change in lateral stability that can be achieved by change in camber, and on the other hand using steering effects associated with the camber adjustment as such. In particular, stabilizing effects of this type, where the change in the camber position is used in the sense of four-wheel steering, can be used at high speeds.

In connection with braking maneuvers, especially emergency braking as can occur, for example in response to activation of the so-called "braking assistant", during response of anti-lock braking systems or the like, camber changes can be initiated to improve stability, in particular in connection with tires whose tread areas have different adhesion coefficients which are used in connection with the change in the camber as tread contact areas, whereby changing the size of the tread contact areas can also be used with the change in the camber.

In connection with tires in which differently-shaped tread areas are used depending on the camber that is set in each case, camber adjustment also offers the option of better managing weather-related driving difficulties, for example, by virtue of the fact that tread areas that are designed as tires equipped with cleats or studs can be brought into use by camber adjustment. In addition, the camber adjustment can also be activated in connection with driving dynamics systems, for example instead of, or in connection with, the measures initiated by such systems during wheel slip, e.g., braking intervention or the like.

The position of the hub carrier's pivot axis according to the present invention, which is set higher than the wheel axis, provides substantial flexibility in camber positioning, since it can also be formed of links that are independent of each other, and it provides extensive options for arranging the actuator that acts between the hub carrier and the intermediate carrier. With the arrangement of the actuator between the hub carrier and intermediate carrier, intervention into the function and design of the suspension links can also be prevented, it being possible to use standard components in the form of hydraulic or electrical actuators, e.g., in the form of hydraulic control cylinders or electrical spindle drives, as actuators. Also, there is a fairly large number of options with regard to the positioning of the pivot axis within the scope of the present invention, so that even driven axles can be handled without difficulty, since the hub carrier can also have different structural forms, e.g., when viewed from the side, can have a sickle shape.

With respect to implementing a substantial modification to camber angle, according to the present invention a pivot axis may be positioned relatively high in relation to the wheel axis. To achieve corresponding track widening which also influences the steering performance, it can be effective to arrange the pivot axis according to the present invention with a certain tilt to the roadway plane, to achieve additional steering effects in connection with the camber adjustment independently of the wheel suspension on the body side and in particular the steering geometry determined by the wheel suspension links and the steering adjustment, in order to more or less compensate the steering effects associated with the camber adjustment. Even without considering the camber adjustment, this can make it possible to more or less maintain the standard steering performance or, conversely, to enhance, if necessary, the steering effects that are adjusted in conjunction with the camber adjustment, e.g., on axles that are not articulated.

If the wheel suspension according to the present invention is used in conjunction with articulated wheels, a vertical steering axis is also to be provided in accordance with the present invention either between the intermediate carrier and wheel suspension, or between the hub carrier and intermediate carrier.

In particular, it also proves to be particularly effective first to provide the wheel suspension with a system carrier that in turn holds the intermediate carrier, it being possible for the steering axis to be disposed between the intermediate carrier and the system carrier, or for the system carrier, as such, to be mounted so that it pivots.

In accordance with another embodiment within the scope of the present invention, a vertical steering axis is provided both between the intermediate carrier and the wheel suspension, as well as between the intermediate carrier and hub carrier, it being possible for these steering axes to also be configured in a crosswise arrangement, and it being advantageous to utilize the swivelling capability with respect to one of these steering axes, in particular the steering axis provided between the intermediate carrier and wheel suspension in conjunction with the intended steering, i.e., the steering input by the driver. In the meantime, the other steering axis, in particular the one between the intermediate carrier and the hub carrier, is used to make steering corrections, for example to adapt to steering movements caused by the wheel suspension or with regard to steering movements of the wheels, that are desirable from the perspective of driving dynamics. Depending on the arrangement of the steering axes, corresponding actuators will be provided that are arranged between the hub carrier and intermediate carrier, between the intermediate carrier and the wheel suspension and/or system carrier, or between the system carrier and wheel suspension.

BRIEF DESCRIPTION OF THE DRAWINGS

The present invention will be explained with further detail below on the basis of exemplary embodiments with reference to the drawings description, in which.

DETAILED DESCRIPTION

Figure 1:
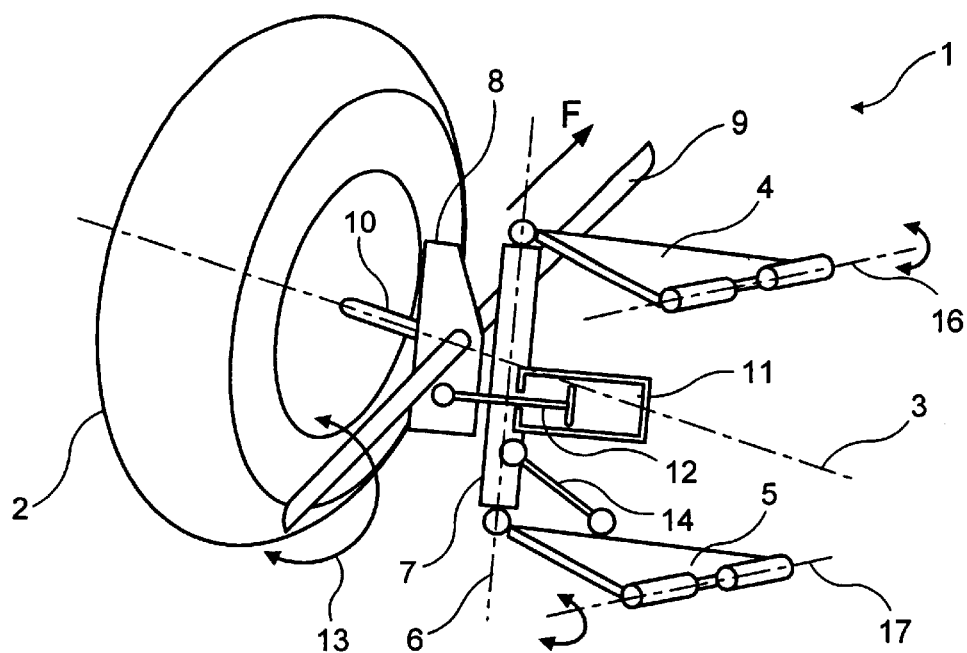
FIG. 1 shows a perspective schematic representation of an independent wheel suspension according to the present invention where an intermediate carrier is provided between the hub carrier and wheel suspension links, and where the hub carrier can be pivoted with respect to the intermediate carrier about an axis running in the longitudinal direction of the vehicle, and its camber position can be changed by way of an actuator assigned to the intermediate carrier.

FIG. 1 shows a diagram of an independent wheel suspension for a multi-track motor vehicle in the form of a passenger car, which is not shown in more detail, with its forward driving direction indicated by the arrow F; the independent wheel suspension is indicated as a unit with 1 and guides a wheel 2 of the vehicle, whose wheel axis is denoted by 3.

The suspension for wheel 2 is illustrated by an upper suspension link 4 and a lower suspension link 5, suspension links 4 and 5 being represented as wishbones connected to the chassis of the vehicle (not shown) about pivot axes 16 and/or 17 running in the longitudinal direction of the vehicle. The representation of the wheel suspension in the form of the previously described, classic design with triangular transverse links only serves as an example. A number of individual links could be used as suspension links in the place of such triangular transverse links.

Suspension links 4 and 5 are each linked to an intermediate carrier 7, on which actual hub carrier 8 is pivoted via a pivot axis 9 running in the vehicle longitudinal direction and transversely to the driving direction. Deviating from the embodiment shown, the pivot axis can also have a non-unitary construction, i.e., be formed of and/or determined by a plurality of pivot pins or articulated joints. Hub carrier 8 holds axle end 10 on which wheel 2 is mounted. Actuator 11 is used to pivot hub carrier 8 about pivot axis 9, which is shown symbolically as a control cylinder which is fixed with respect to intermediate carrier 7 and whose piston rod 12 is pivoted on hub carrier 8. The ability of hub carrier 8 to swivel about pivot axis 9 running in driving direction F, shown here in a stylized manner as a solid physical axle, is indicated by double arrow 13, a pivoting of wheel 2 in the sense of an adjustment of the wheel camber toward the negative ensuing in response to piston rod 12 moving out as a result of the corresponding pressurization of control cylinder 11.

The schematic representation according to FIG. 1 illustrates that adjusting the camber of wheel 2 by swivelling hub carrier 8 about axis 9 using actuator 11, does not influence the basic geometry of the independent wheel suspension determined by suspension links 4 and 5 and intermediate carrier 7 assigned to them. Thus, this geometry is maintained, regardless of the camber position of wheel 2 that is adjusted by swivelling hub carrier 8, whereby, as FIG. 1 shows, with the use of the wheel suspension for an articulated axle, the intermediate carrier is also swivelled by the steering about its vertical axis 6 as a steering axis. A part of the relevant steering linkage is symbolically indicated by 14 in FIG. 1.

A position that, when extended in the vehicle longitudinal direction, is essentially parallel to the roadway, i.e., a normally horizontal position, is preferable for pivot axis 9, as shown symbolically. However, a certain adjustment in the vertical direction also makes it possible to tie this position to steering effects in the adjustment of the camber by swivelling hub carrier 8 about axis 9, making it possible to either compensate or, if indicated, enhance changes in the steering geometry brought about by camber adjustments and associated changes in tread contact width as a function of the setting of pivot axis 9.

Figure 2:
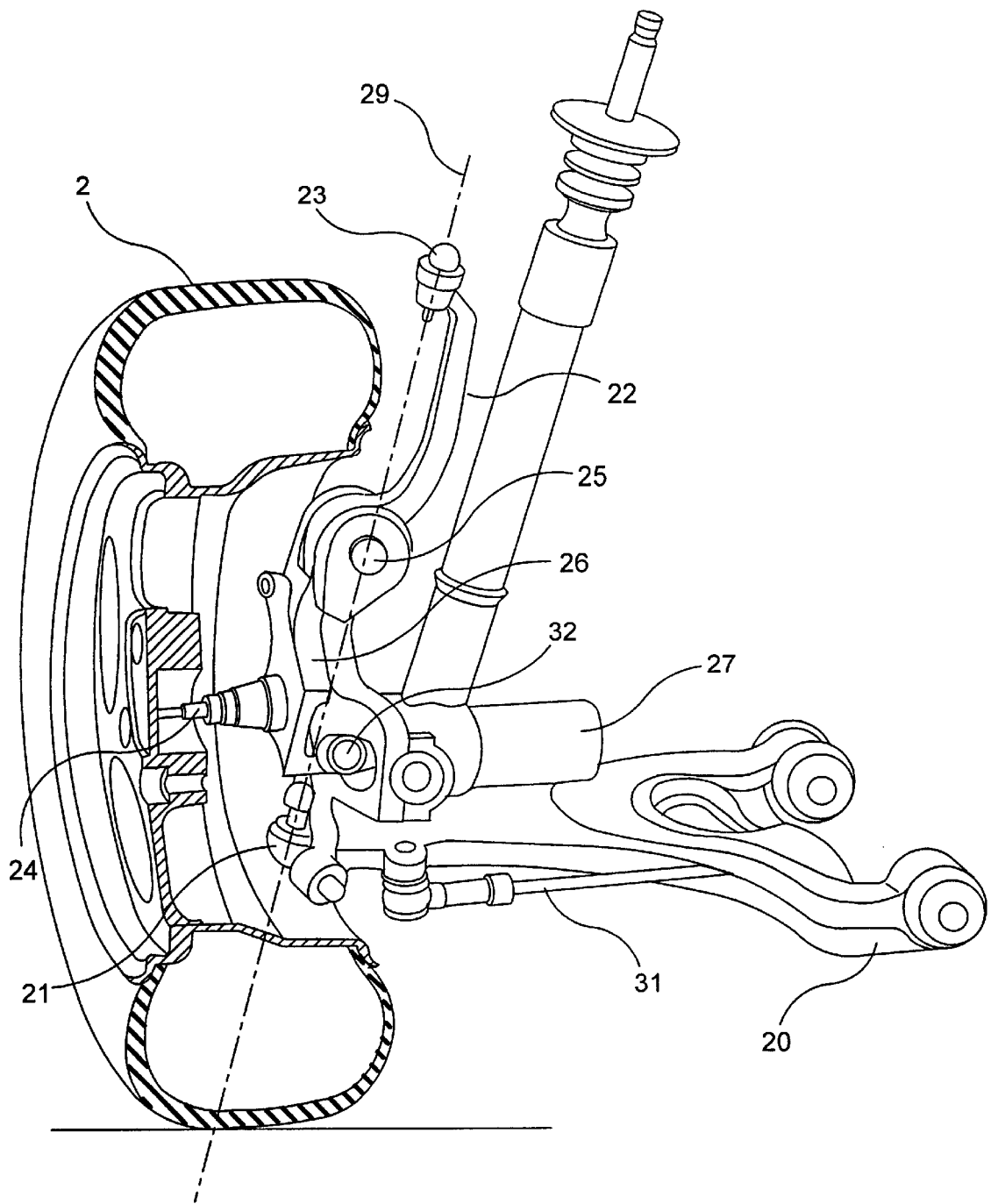
FIG. 2 shows an embodiment of an independent wheel suspension that results from the principle according to FIG. 1, in a partially cut-away perspective rear view.
Figure 3:
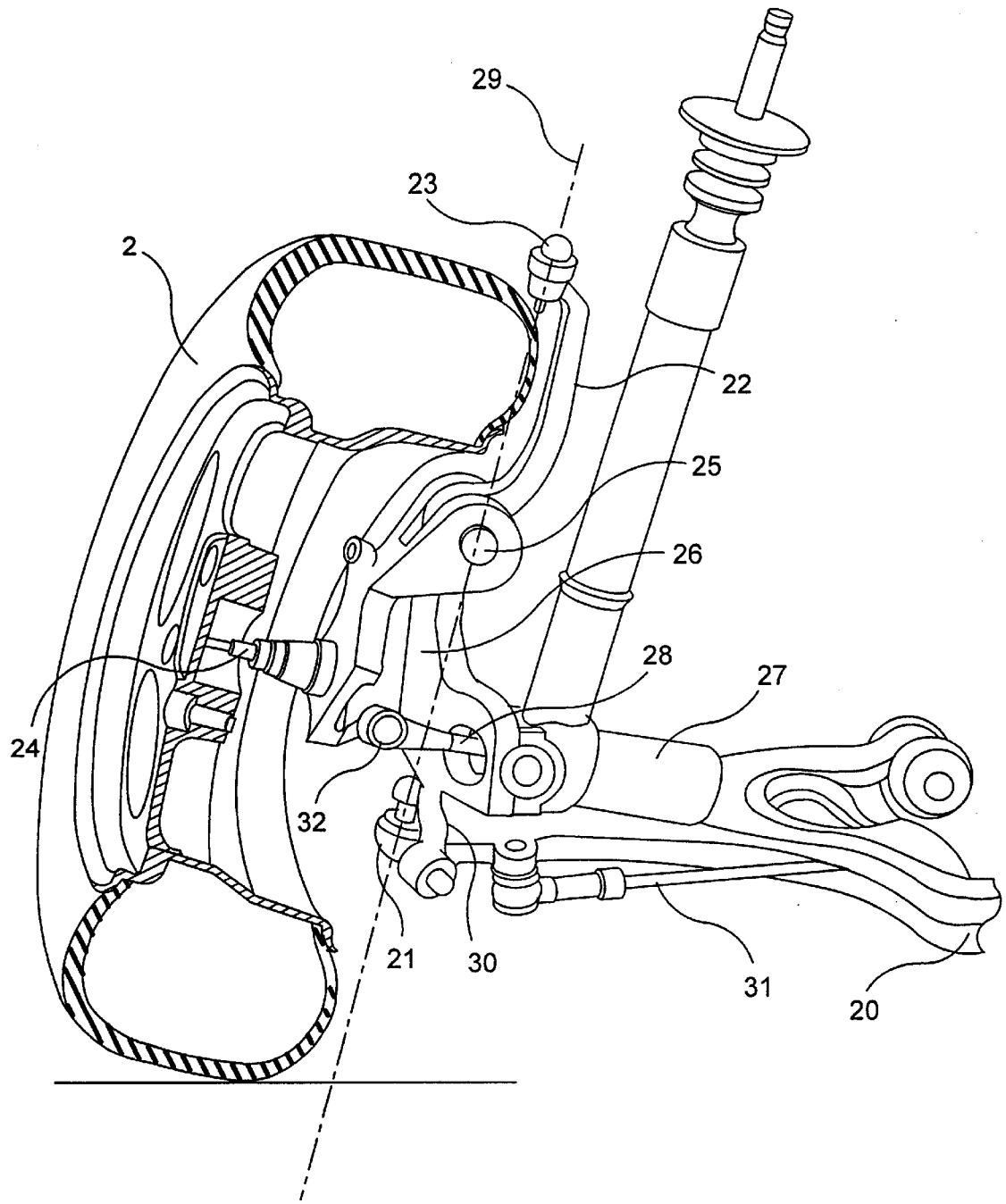
FIG. 3 shows a representation corresponding to FIG. 2 with a wheel that is pivoted into a negative camber position.

FIGS. 2 and 3 show, also in strictly schematic form, one possible practical embodiment of an independent wheel suspension according to the present invention having active camber control. In this context, the lower suspension link of the independent wheel suspension is denoted by 20 in FIGS. 2 and 3 and formed by an wishbone to which intermediate carrier 22 is coupled by way of the partially visible joint 21 which, extending upward, ends in a joint 23 on which an upper suspension link (not shown in more detail) engages.

In the area above the wheel axis, which is determined by axle end 24, intermediate carrier 22 forms the bearing point for pivot axis 25 running in the longitudinal direction of the vehicle, by way which hub carrier 26 holding axle end 24 is linked to hub carrier 22. Actuator 27, which is designed as a control cylinder and has its piston rod 28 coupled to hub carrier 26 at a distance from pivot axis 25, is also mounted on intermediate carrier 22 opposite hub carrier 26. Joints 21 and 23, by way of which intermediate carrier 22 is joined to wheel suspension links (partially not shown), e.g., to lower suspension link 20, determine steering axis 29. With respect to swivel movements about steering axis 29, intermediate carrier 22 is supported by steering knuckle arm 30 and tie rod 31, which is coupled, in turn, given non-articulated axles, (in a manner that is not shown in more detail) to lower suspension link 20 that is designed as an A-arm, or which can even be supported on the automobile body. It is optionally possible for the tie rod to be coupled, given articulated axles, to a steering drive (not shown in more detail, the steering drive being preferably designed in such a way that the respective steering angle for the wheels can be adjusted independently and in adaptation to the particular camber that has currently been set or is being set.

FIGS. 2 and 3 show that, in the design approach according to the present invention, hub carrier 26 can also be fairly irregular in shape in the connection between pivot axis 25 and the joint 32 at the connection to piston rod 28, so the camber adjustment according to the present invention is well suited for making adaptations to existing basic designs and can also be used favorably in conjunction with driven axles.

As shown in the comparison of FIGS. 2 and 3, within the scope of the present invention, camber modifications can be made over relatively substantial angular ranges. FIG. 2 shows the standard design position of wheel 2 for an independent wheel suspension, while in FIG. 3, in reference to the same wheel suspension, a wheel camber within the range of about 20 to 30 degrees has been set.

Camber adjustments on the order of magnitude of 20 degrees offer ample possibilities for influencing the driving performance of the vehicle, preferably in conjunction with special tires that have an asymmetrical tread contour and on which a tread area of the tire that has a convex rounding with a fairly large radius of curvature is assigned to the inside of the wheel, so that at large camber angles the tire does not run on one tire edge as it would with standard tires for multitrack vehicles having an essentially flat tread surface. Rather, the tire runs on a special tread area formed by the convex rounding and which, in view of the particular special requirements and desired characteristics with respect to material and tread surface structure, can be designed so that it deviates from the adjacent flat tread area toward the outside of the tire and so, for example, can have a softer rubber mixture. Because of this, it is possible to a greater extent to use the independent wheel suspension, supplemented according to the present invention by an active camber adjustment, in such a way that the driving dynamics properties during cornering, during highly dynamic obstacle avoidance maneuvers, during emergency braking or even with special road conditions, e.g., with slippery roads, can be influenced and in particular improved using the camber adjustment.

In this way, the camber adjustment can also be used in conjunction with driving programs the driver may select in order, for example, to permit especially sporty driving or to adapt to winter road conditions.

However, the adjustment of the respective camber is effectively reserved for open loop or closed loop control programs, which can also sometimes be activated by other vehicle systems such as the so-called "braking assistant," or also by the anti-lock braking system in the case of emergency braking, if especially high braking power is required. In this regard, the camber adjustment offers the possibility of shifting to one area of the tire tread by changing the camber, thus enabling particularly high coefficients of adhesion to the roadway.

Figure 4:
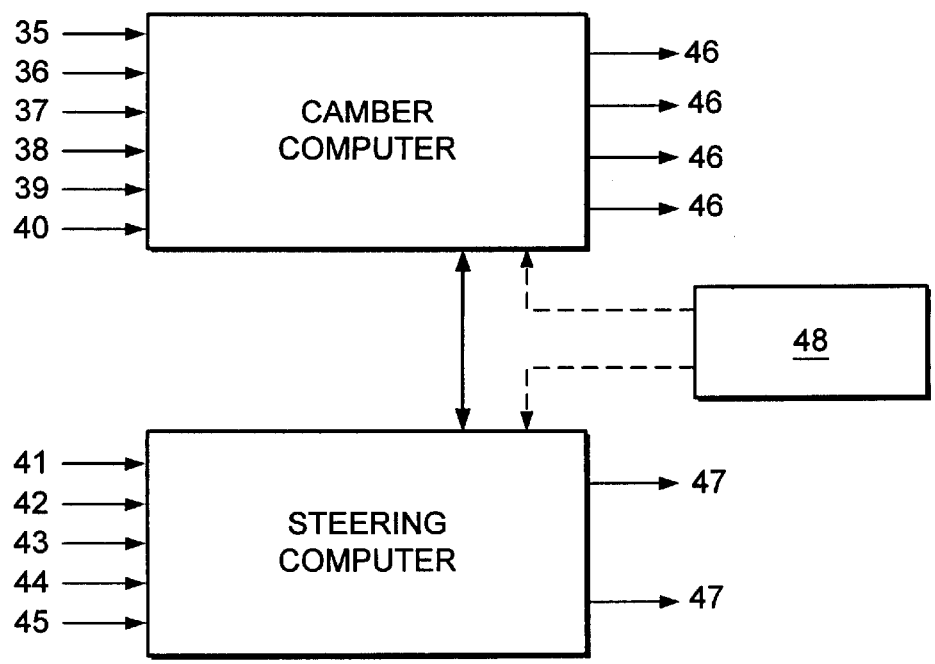
FIG. 4 shows a schematic representation of the open loop and/or closed loop control unit with significant input and output variables that are used to determine the particular wheel camber for the active camber position of the wheel and execute or trigger a corresponding activation of the actuator.

FIG. 4 shows, in schematic form, how the particular camber is effectively specified using a camber computer that cooperates with the steering computer, taking into account the reciprocal dependencies between the specified steering geometry and deviations therefrom caused by camber modifications.

The various input variables are represented here only symbolically, and it is effective for the camber computer to record at least actual camber angle 35, transverse acceleration 36, vehicle speed 37, steering angle 38, road condition 39, yaw rate 40, and possibly also steering-wheel angular velocity.

Transverse acceleration 41, vehicle speed 42, steering wheel angle 43, yaw rate 44, and actual camber angle 45, for example, are shown as variables that influence the steering computer. To the extent that the same characteristic quantities are needed both for the camber and for the steering computer, these can be exchanged between the two. The reference camber angle for the four wheels of a vehicle, symbolically indicated by arrows 46, is specified by the camber computer, and reference angle 47 for the wheels of the particular axle(s) being steered is specified by the steering computer.

If additional systems, e.g., the braking assistant, driving dynamics programs, anti-lock braking systems or the like are associated with the vehicle, these additional systems, as indicated symbolically by 48, can be linked to the camber computer and/or the steering computer to permit utilization of the camber adjustment in connection with these systems and/or as extensions of them. This means, for example, that wheels can be adjusted in the aforesaid manner to maximum camber during emergency braking initiated by the braking assistant. This can occur analogously in conjunction with driving dynamics systems, since the design approach according to the present invention makes it possible to set the particular camber angle required for each wheel.

The active camber adjustment according to the present invention thus offers many possibilities for influencing driving performance with relatively low design effort and without intervention into the actual wheel suspension. This is true for different structural forms of wheel suspensions, so that there are broad ranges of application; in particular, this is not just restricted to sporty vehicles. However, particularly wide-ranging possibilities and advantages result for the latter. Hence, designs according to the present invention that are associated with sporty vehicles are of particular significance.

Figure 5:
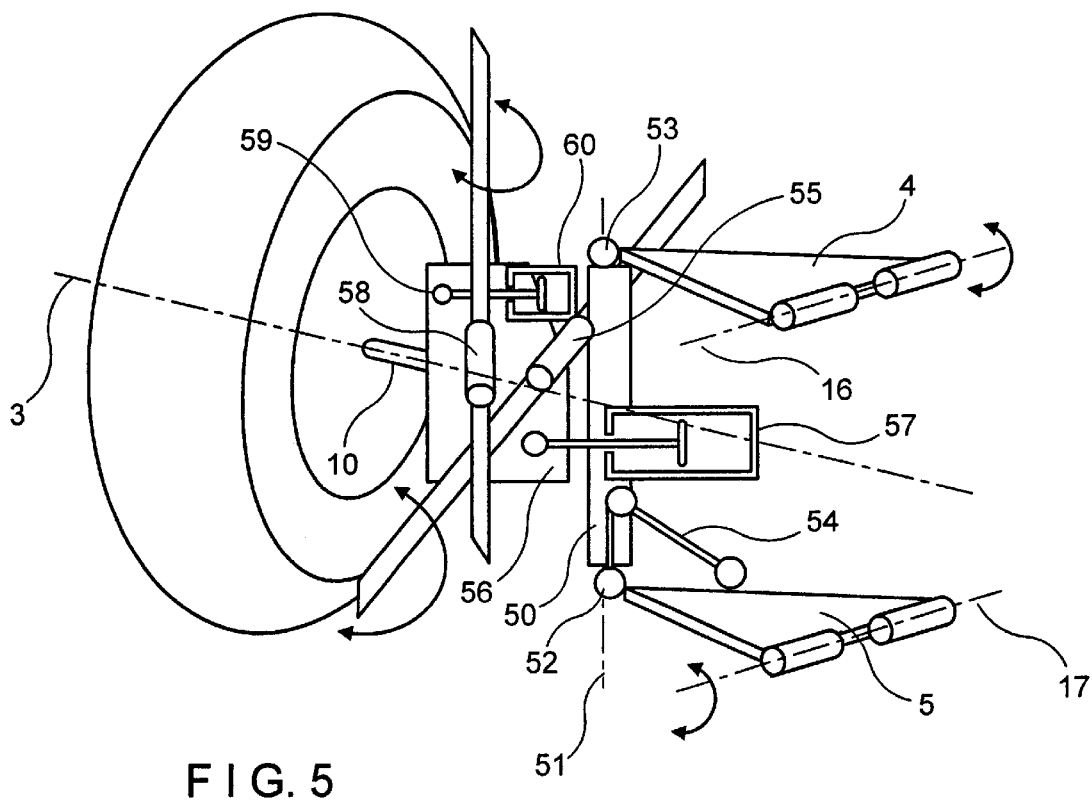
FIG. 5 shows another perspective schematic representation of a wheel suspension according to the present invention with a steering axis arranged between the intermediate carrier and hub carrier.

FIG. 5 shows another perspective schematic representation of a wheel suspension according to the present invention that is similar to the one in FIG. 1.

In this embodiment, the wheel suspension also includes an upper suspension link 4 and a lower suspension link 5, and the pivot axis lying within the body-side joint of the respective suspension link 4, 5 is designated by 16 for the upper link and by 17 for the lower link. Links 4 and 5 assigned to the wheel suspension hold a system carrier 50, it being possible for this system carrier 50 to be supported so as to be rotatably fixed or movable relative to suspension links 4 and 5, with reference to a vertical axis 51 defined by its articulation points 52 and 53. This is indicated symbolically by a track arm 54 which, on the one hand, is mounted with articulation on system carrier 50, offset from axis 51, and which, on the other hand, given a rotationally fixed supporting of system carrier 50, can be braced against one of the suspension links, in this case suspension link 5 on the body—a non-steerable system carrier 50—or which, for example, can be coupled to the vehicle steering by way of a tie rod (not shown), so that axis 51 forms a steering axis.

System carrier 50 is coupled to an intermediate carrier 56 so that it can pivot about an axis 55, whereby the pivot axis 55 runs in driving direction F and, in fact, with a position that is parallel to or tilted in relation to the driving plane. Intermediate carrier 56 is supported in relation to the pivot axis 55 by an actuator 57 that is shown symbolically as a control cylinder and which in turn, as indicated, is supported in relation to system carrier 50. Thus, intermediate carrier 56 can be pivoted about pivot axis 55 in relation to system carrier 50 by actuator 57, an outward position of intermediate carrier 56 corresponding to a cambering of wheel 2 in the negative direction.

Intermediate carrier 56 is coupled by way an additional pivot axis 58, which runs vertically and is preferably almost vertical, to hub carrier 59 which holds axle end 10 upon which wheel 2 is rotatably mounted opposite hub carrier 59. With respect to the pivoting capability about axis 58, hub carrier 59 is supported in relation to intermediate carrier 56 by way of actuator 60.

If system carrier 50 is not able to swivel in relation to axis 51, axis 58 can be used as the steering axis if the intention is to provide steering capability for wheel 2. In this case, the corresponding adjustment can be made via actuator 60, which is able to receive an appropriate signal, as a function, for example, of the steering wheel position.

Within the scope of the present invention, one especially effective design approach provides for both a swivelling capability of system carrier 50 with respect to axis 51 in the sense of a steering axis, as well as an adjustability of hub carrier 59 about axis 58 with respect to intermediate carrier 56. In this case, the intermediate carrier, the hub carrier and the wheel can be steered by swivelling about axis 51 as a steering axis in the standard manner, and a superimposed steering can also be implemented by the additional steering capability of wheel 2 by hub carrier 59 in relation to intermediate carrier 56, for example in order to undertake steering angle corrections as a function of driving dynamics conditions, or to correct undesirable effects of the wheel suspension. This can be particularly effective in the case of substantial wheel camber modifications, as occur, for example, in conjunction with the active camber adjustment of the wheel toward the negative, or even in order to counteract vehicle instabilities resulting from braking or other types of driving maneuvers.

Figure 6:
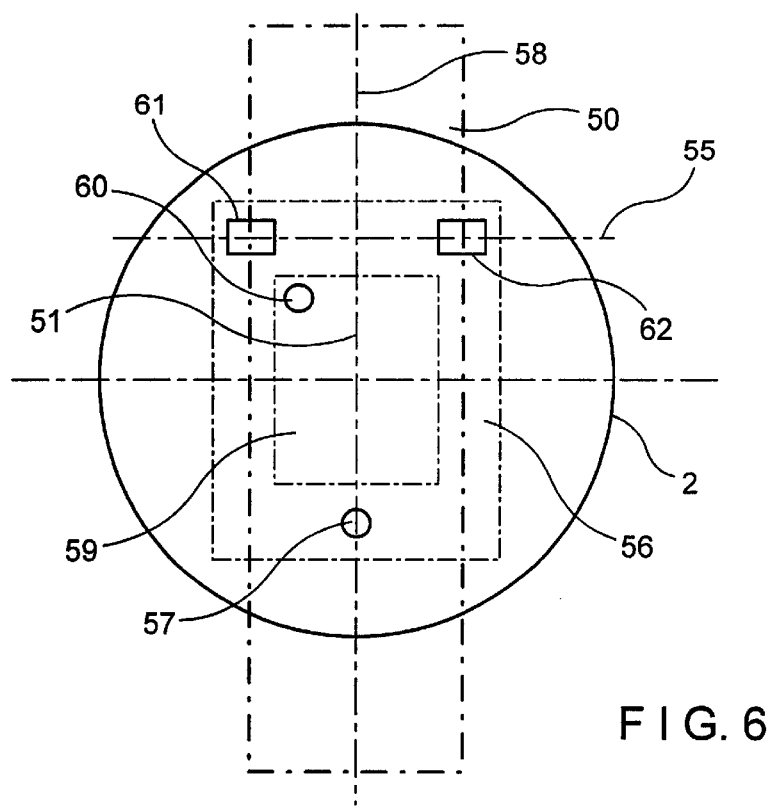
FIG. 6 shows a schematic representation of the relative positions according to the present of pivot axes and associated actuators.

FIG. 6 schematically shows possible positions according to the present invention of pivot axis 55 between system carrier 50 and intermediate carrier 56, whereby the position of pivot axis 55 is symbolized by two hinge-like joints 61, 62. Actuator 57 is arranged so as to be vertically offset in relationship to pivot axis 55 and, for example with pivot axis 55 positioned above the wheel axis, is arranged in the area underneath the wheel axis, preferably somewhat symmetrically between joints 61, 62.

As FIG. 6 shows, the actuator 60 is laterally offset in relationship to pivot axis 58, while, as shown by the schematic representation according to FIG. 6, another structural space exists with respect to the arrangement of actuators 57 and 60 within the scope of the present invention, so that, in each case, design necessities can be taken into account in an advantageous manner.

Control cylinders, control spindles or similar types of servo-drives have been provided as actuators within the scope of the present invention, which—depending on wear—make it possible to repeat adjustment operations and various setting positions, as desired. As a deviation from this, according to the present invention, the use of actuators that are suitable only for one-time use can also be effective, whereby these can also be used in addition to the multiple-use actuators described above. For example, snap bolts, pre-stressed spring supports or the like can be used as actuators for one-time use. The purpose of such single-use use actuators is, for example, an adjustment to negative camber in emergencies, for example triggered in a response by the ABS, by achieving critical lateral torque values or the like in order to stabilize the vehicle. The use in such "emergencies" may justify the repair and replacement effort associated with them, but does not prevent any further driving operation, although it may reduce it. With a negative camber, and also in the case of use in conjunction with multiple actuators, it is preferable to initiate emergency measures which subsequently render possible regular operation, i.e., by using the multiple-use actuator.

What is claimed is:

1. A suspension system for a wheel of a motor vehicle, the wheel suspension system comprising:

at least one body-side wheel suspension member;

a hub carrier including an axle end holding the wheel and defining a pivot axis, the pivot axis being disposed in the vehicle longitudinal direction and being vertically offset from a rotational axis of the wheel, the hub carrier being capable of pivoting to set a negative camber of the wheel on an order of magnitude of about 20–30 degrees so that a tread contact surface of a tire of the wheel is moved to a tread area of the tire that is adjacent to an inside of the wheel;

an intermediate carrier disposed between the body-side wheel suspension member and the hub carrier, the hub carrier being capable of pivoting on the intermediate carrier about the pivot axis; and an actuator acting in a transverse direction of the vehicle for active adjustment of the camber of the wheel with reference to the pivot axis, the actuator supporting the hub camera against the intermediate carrier.

2. The wheel suspension system as recited in claim 1 wherein the wheel suspension system is an independent wheel suspension system for passenger cars.

3. The wheel suspension system as recited in claim 1 wherein the body-side wheel suspension member includes at least one suspension link forming an independent suspension.

4. The wheel suspension system as recited in claim 3 wherein the pivot axis is disposed above the wheel axis.

5. The wheel suspension system as recited in claim 1 wherein the pivot axis is disposed below the wheel axis.

6. The wheel suspension system as recited in claim 1 wherein the pivot axis is disposed parallel to the tread contact surface.

7. The wheel suspension system as recited in claim 6 wherein the pivot axis is disposed horizontally.

8. The wheel suspension system as recited in claim 1 wherein the pivot axis is disposed at an angle with respect to the tread contact surface.

9. The wheel suspension system as recited in claim 8 wherein the pivot axis is disposed at a downward angle diagonally toward the front of the vehicle with respect to the tread contact surface.

10. The wheel suspension system as recited in claim 8 wherein the pivot axis is disposed at an upward angle diagonally toward the front of the vehicle with respect to the tread contact surface.

11. The wheel suspension system as recited in claim 1 wherein the actuator includes a hydraulic actuator.

12. The wheel suspension system as recited in claim 1 wherein the actuator includes an electrically operated actuator.

13. The wheel suspension system as recited in claim 1 wherein the actuator is disposed opposite the pivot axis with respect to the wheel axis.

14. The wheel suspension system as recited in claim 1 wherein the hub carrier is capable of pivoting on the intermediate carrier about the pivot axis at a pivot, the pivot and a point of support of the hub carrier by the actuator being disposed in an area near a vertical median transverse plane of the wheel.

15. The wheel suspension system as recited in claim 1 wherein at least one of the pivot axis and a point of support of the hub carrier by the actuator is offset laterally from a vertical median transverse plane of the wheel.

16. The wheel suspension system as recited in claim 15 wherein the pivot axis and the point of support of the hub carrier by the actuator are on a same side of the vertical median transverse plane of the wheel.

17. The wheel suspension system as recited in claim 1 wherein the intermediate carrier is capable of pivoting about a vertical pivot axis with respect to the body-side wheel suspension member.

18. The wheel suspension system as recited in claim 17 wherein the vertical pivot axis is a steering axis of the vehicle.

19. The wheel suspension system as recited in claim 1 wherein the at least one body-side wheel suspension member includes at least one suspension link and a system carrier disposed within a transition area of the at least one suspension link to the intermediate carrier.

20. The wheel suspension system as recited in claim 1 wherein the body-side wheel suspension member includes a system carrier, the pivot axis being disposed between the intermediate carrier and the body-side wheel suspension and being located on the system carrier.

21. The wheel suspension system as recited in claim 1 wherein the body-side wheel suspension member includes a system carrier and wherein the hub carrier is capable of pivoting about a vertical axis disposed between the intermediate carrier and the body-side wheel suspension and located on the system carrier.

* * * * *